(12) United States Patent
Watanabe

(10) Patent No.: US 8,930,111 B2
(45) Date of Patent: Jan. 6, 2015

(54) BRAKING FORCE CONTROL APPARATUS AND BRAKING FORCE CONTROL METHOD FOR VEHICLE

(75) Inventor: Yoshinori Watanabe, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 84 days.

(21) Appl. No.: 13/824,657

(22) PCT Filed: Oct. 28, 2011

(86) PCT No.: PCT/IB2011/002570
§ 371 (c)(1),
(2), (4) Date: Mar. 18, 2013

(87) PCT Pub. No.: WO2012/056310
PCT Pub. Date: May 3, 2012

(65) Prior Publication Data
US 2013/0204503 A1 Aug. 8, 2013

(30) Foreign Application Priority Data
Oct. 29, 2010 (JP) ................................ 2010-244272

(51) Int. Cl.
*B60B 39/00* (2006.01)
*G05D 1/00* (2006.01)
*B60T 8/1761* (2006.01)
*B60T 8/1766* (2006.01)
*B60T 8/1755* (2006.01)

(52) U.S. Cl.
CPC .............. *B60T 8/1761* (2013.01); *B60T 8/1766* (2013.01); *B60T 8/1755* (2013.01); *B60T 2201/16* (2013.01); *B60T 2230/03* (2013.01); *B60T 2240/06* (2013.01)
USPC ........ 701/71; 701/1; 701/70; 701/74; 701/78; 701/75

(58) Field of Classification Search
CPC combination set(s) only.
See application file for complete search history.

(56) References Cited

U.S. PATENT DOCUMENTS

| | | | |
|---|---|---|---|
| 5,855,419 | A | 1/1999 | Urai et al. |
| 5,975,650 | A | 11/1999 | Meier et al. |
| 6,322,167 | B1 | 11/2001 | Pruhs et al. |

FOREIGN PATENT DOCUMENTS

| | | |
|---|---|---|
| DE | 196 51 460 | 6/1998 |
| JP | 9 2220 | 1/1997 |
| JP | 10 500924 | 1/1998 |
| JP | 10 138895 | 5/1998 |
| WO | 03 039927 | 5/2003 |

OTHER PUBLICATIONS

International Search Report Issued Mar. 19, 2012 in PCT/IB11/02570 Filed Oct. 28, 2011.

*Primary Examiner* — Bhavesh V Amin
(74) *Attorney, Agent, or Firm* — Oblon, Spivak, McClelland, Maier & Neustadt, L.L.P.

(57) ABSTRACT

A vehicle braking force control apparatus includes a controller that performs a front-rear braking force distribution control in which the braking forces applied to the left and right rear wheels are controlled individually so that a wheel speed of each of the rear wheels is equal to a target wheel speed of the rear wheel, which is set based on a predetermined relationship between the wheel speed of the front wheel and the target rear wheel speed of the rear wheel, and that corrects the target wheel speed of at least one of the left and right rear wheels, based on a parameter related to a change rate of load shift amount in a vehicle transverse direction, so that the target wheel speed of the rear wheel on a ground contact load increase side is less than the target wheel speed of the rear wheel on a ground contact load decrease side.

11 Claims, 11 Drawing Sheets

BRAKING FORCE CONTROL APPARATUS AND BRAKING FORCE CONTROL METHOD FOR VEHICLE

BACKGROUND OF THE INVENTION

1. Field of the Invention

The invention relates to a braking force control apparatus and a braking force control method that perform a front-rear braking force distribution control that distributes a braking force to front wheels and rear wheels.

2. Description of the Related Art

A braking force control apparatus that performs a front-rear braking force distribution control that distributes a braking force to front wheels and rear wheels has been known. For example, Japanese Patent Application Publication No. 10-138895 (JP-A-10-138895) describes a braking force control apparatus that controls the braking forces applied to the left and right rear wheels individually so that a difference between the greater one of the wheel speeds of the left and right front wheels and the wheel speed of the left and right rear wheels reaches a value in a predetermined value.

In a vehicle equipped with a conventional braking force control apparatus that performs the front-rear braking force distribution control, similarly to the braking force control apparatus described in Japanese Patent Application Publication No. 10-138895 (JP-A-10-138895), the vehicle sometimes wobbles, if braking is performed during a high-speed travel.

Generally, the center of gravity of a vehicle is shifted from the center of the vehicle in the left-right direction. It is considered that the foregoing phenomenon occurs because the left and right wheels have different ground contact loads. In the case where a braking force is applied to left and right wheels, the wheel whose ground contact load is smaller achieves a greater effect of deceleration. Accordingly, the vehicle tends to turn toward the side of the wheel whose ground contact load is smaller, even if the steered wheels are in the straight travel position. Thus, an unintended yaw rate occurs in the vehicle, and the vehicle subjected to an unintended roll moment to roll because of the unintended roll moment. As a result, the vehicle wobbles left and right.

As the vehicle rolls, shifting of load in the transverse direction of the vehicle occurs, and therefore the ground contact loads of the left and right wheels fluctuate. When the braking force is controlled so that the braking slips (the degrees of slip at the time of braking) of the left and right rear wheels relative to the braking slip of the front wheels become equal, according to the front-rear braking force distribution control, the braking forces applied to the left and right wheels are controlled so as to be proportional to the ground contact loads thereof.

However, the roll behavior of a vehicle is in a first-order lag relation with the unintended yaw rate of the vehicle. Therefore, although the braking forces applied to the left and right rear wheels are controlled according to the front-rear braking force distribution control, the wobble of the vehicle caused by the unintended roll moment may not be restrained and the roll behavior of the vehicle may deteriorate, because of the control lag.

SUMMARY OF THE INVENTION

The invention provides a braking force control apparatus and a braking force control method for a vehicle which restrain the wobble of the vehicle caused by an unintended yaw rate when the front-rear braking force distribution control is performed.

A first aspect of the invention relates to a vehicle braking force control apparatus that includes a controller that performs a front-rear braking force distribution control that distributes a braking force to front wheels and rear wheels, wherein in the front-rear braking force distribution control, the braking forces applied to the left and right rear wheels are controlled individually so that a wheel speed of each of the rear wheels is equal to a target wheel speed of the rear wheel, which is set based on a predetermined relationship between the wheel speed of the front wheel and the target rear wheel speed of the rear wheel, and that corrects the target wheel speed of at least one of the left and right rear wheels, based on a parameter that is related to a change rate of amount of load shift in a vehicle transverse direction, so that the target wheel speed of the rear wheel on a ground contact load increase side is less than the target wheel speed of the rear wheel on a ground contact load decrease side.

According to the above-described construction, the target wheel speed of the at least one of the left and right rear wheels is corrected on the basis of the parameter that is related to the change rate of the amount of load shift in the vehicle transverse direction so that the target wheel speed of the rear wheel on the ground contact load increase side is less than the target wheel speed of the rear wheel on the ground contact load decrease side. Hence, while the front-rear braking force distribution control is performed, the braking forces applied to the left and right rear wheels can be controlled so that the braking force applied to the rear wheel on the ground contact load increase side is greater than the braking force applied to the rear wheel on the ground contact load decrease side. Therefore, due to the difference in braking force between the left and right rear wheels, a yaw moment can be given to the vehicle so as to restrain increases and decreases of the ground contact loads.

In this case, the target wheel speed is corrected based on the parameter that is related to the change rate of the amount of load shift in the vehicle transverse direction, which is advanced in phase relative to the amount of load shift in the vehicle transverse direction. Hence, the target wheel speed of the at least one of the left and right rear wheels can be corrected by the correction amount that is advanced in phase relative to the change in the ground contact loads of the left and right rear wheels caused by a load shift in the vehicle transverse direction. Therefore, a yaw moment that is advanced in phase relative to the change in the ground contact loads of the left and right rear wheels can be given to the vehicle so that occurrence of an unintended yaw rate can be effectively restrained. Consequently, the wobble of the vehicle can be effectively reduced, and deterioration of the roll of the vehicle resulting from a control lag can be restrained.

The controller may correct the target wheel speed of the at least one of the left and right rear wheels so that a difference in the target wheel speed between the left and right rear wheels after the target wheel speed of the at least one of the left and right rear wheels is corrected corresponds to the parameter.

According to the foregoing construction, the target wheel speed of the at least one of the left and right rear wheels is corrected so that the difference in the target wheel speed between the left and right rear wheels after the target wheel speed of the at least one of the left and right rear wheels is corrected corresponds to the parameter. Therefore, occurrence of an unintended yaw rate can be effectively reduced, and therefore the wobble of the vehicle can be effectively reduced.

The controller may correct the target wheel speed of each of the left and right rear wheels so that a magnitude of a correction amount for correcting the target wheel speed of the left rear wheel and the magnitude of a correction amount for correcting the target wheel speed of the right rear wheel are equal to each other.

According to the foregoing construction, the magnitude of the correction amount for correcting the target wheel speed of the left rear wheel and the magnitude of the correction amount for correcting the target wheel speed of the right rear wheel are equal to each other. Hence, the sum of the target wheel speeds of the left and right rear wheels after the correction is equal to the sum of the target wheel speeds of the left and right rear wheels before the correction. Therefore, since the braking forces distributed to the front and rear wheels are not affected by the correction of the target wheel speeds, the braking force distributed to the rear wheels, which needs to be achieved by the left and right rear wheels as a whole, can be achieved.

The parameter may include one of a yaw acceleration of the vehicle, a roll rate of the vehicle, a lateral jerk of the vehicle, a change rate of a difference in ground contact loads between left and right wheels.

According to the foregoing construction, since the parameter includes the yaw acceleration of the vehicle, the roll rate of the vehicle, the lateral jerk of the vehicle, and the change rate of the difference in the ground contact loads between the left and right wheels, the parameter can show the change rate of the amount of load shift in the vehicle transverse direction.

The controller may change a correction amount for correcting the target wheel speed of the at least one of the left and right rear wheels, based on a vehicle speed, so that the correction amount is greater in magnitude when the vehicle speed is relatively high than when the vehicle speed is relatively low.

In general, the wobble of the vehicle is greater when the vehicle speed is relatively great than when the vehicle speed is relatively small. According to the foregoing construction, the correction amount for correcting the target wheel speed of the at least one of the left and right rear wheels can be changed on the basis of the vehicle speed, so that the correction amount is larger in magnitude when the vehicle speed is relatively great than when the vehicle speed is relatively small. Therefore, it is possible to retrain the correction amount from becoming insufficient when the vehicle speed is relatively great while restraining the correction amount from becoming excessively large when the vehicle speed is relatively small. Due to this, the wobble of the vehicle can be suitably reduced irrespective of the vehicle speed.

The controller may change a correction amount for correcting the target wheel speed of the at least one of the left and right rear wheels, based on an elapsed time following a time point at which the target wheel speed of the at least one of the left and right rear wheels starts to be corrected, so that the correction amount is smaller in magnitude when the elapsed time is relatively long than when the elapsed time is relatively short.

According to the foregoing construction, the correction amount for correcting the target wheel speed of the at least one of the left and right rear wheels can be changed on the basis of the elapsed time following the time point at which the front-rear braking force distribution control is started, so that the correction amount is smaller in magnitude when the elapsed time is relatively long than when the elapsed time is relatively short. Therefore, the correction amount can be reduced corresponding to the vehicle speed declining with increases of the elapsed time. Due to this, the control amount for reducing the wobble of the vehicle can be reduced according to the elapsed time so that the control amount does not become excessively large.

The controller may change a correction amount for correcting the target wheel speed of the at least one of the left and right rear wheels, based on an index value of a change rate of deceleration of the vehicle when the target wheel speed of the at least one of the left and right rear wheels starts to be corrected, so that the correction amount is larger in magnitude when the index value is relatively great than when the index value is relatively small.

According to the foregoing construction, the correction amount can be changed on the basis of the index value of the change rate of the deceleration of the vehicle when the target wheel speed starts to be corrected, so that the correction amount is larger in magnitude when the index value is relatively great than when the index value is relatively small. Hence, it is possible restrain the correction amount from becoming insufficient when the index value of the change rate of the deceleration of the vehicle is great. Besides, when the index value of the change rate of the deceleration of the vehicle is small, the correction amount can be restrained from becoming excessively large. Therefore, the target wheel speed can be properly changed irrespective of the magnitude of the index value of the change rate of the deceleration of the vehicle occurring when the target wheel speed starts to be corrected.

The controller may estimate the parameter based on at least the wheel speeds of a pair of left and right wheels.

According to the foregoing construction, the parameter can be estimated on the basis of at least the wheel speeds of one pair of left and right of wheels that are detected in order to perform the front-rear braking force distribution control.

The predetermined relationship may be a relationship in which the target wheel speed of the rear wheel is greater than the wheel speed of the front wheel by a wheel speed target difference.

The controller may control the braking forces applied to the left and right rear wheels individually so that a degree of slip of each of the rear wheels is equal to a target degree of slip of the rear wheel, which is set based on the predetermined relationship, to control the braking forces applied to the left and right rear wheels individually so that the wheel speed of each of the rear wheels is equal to the target wheel speed of the rear wheel, and may correct the target degree of slip of the at least one of the left and right rear wheels based on the parameter so that the target degree of slip of the rear wheel on a ground contact load increase side is greater than the target degree of slip of the rear wheel on a ground contact load decrease side to correct the target wheel speed of the at least one of the left and right rear wheels.

According to the foregoing construction, by controlling the braking forces applied to the left and right rear wheels individually so that the degree of slip of each rear wheel is equal to the target degree of slip, it is possible to correct the target wheel speed of the at least one of the left and right rear wheels and therefore reduce the wobble of the vehicle, while performing the front-rear braking force distribution control.

The predetermined relationship may be a relationship in which the target degree of slip of the rear wheel is less than the degree of slip of the front wheel by a slip degree target difference.

A second aspect of the invention relates to a vehicle braking force control method that includes: performing a front-rear braking force distribution control that distributes a braking force to front wheels and rear wheels, wherein in the front-rear braking force distribution control, the braking forces applied to the left and right rear wheels are controlled individually so that a wheel speed of each of the rear wheels is equal to a target wheel speed of the rear wheel, which is set based on a predetermined relationship between the wheel speed of the front wheel and the target rear wheel speed of the rear wheel, and correcting the target wheel speed of at least one of the left and right rear wheels, based on a parameter that is related to a change rate of amount of load shift in a vehicle transverse direction, so that the target wheel speed of the rear wheel on a ground contact load increase side is less than the target wheel speed of the rear wheel on a ground contact load decrease side.

According to the foregoing construction, it is possible to effectively reduce the wobble of the vehicle and restrain the deterioration of the rolling of the vehicle caused by a control lag, as in the first aspect.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

With reference to the accompanying drawings, embodiments of the invention will be described in detail below.

First Embodiment

Figure 1:
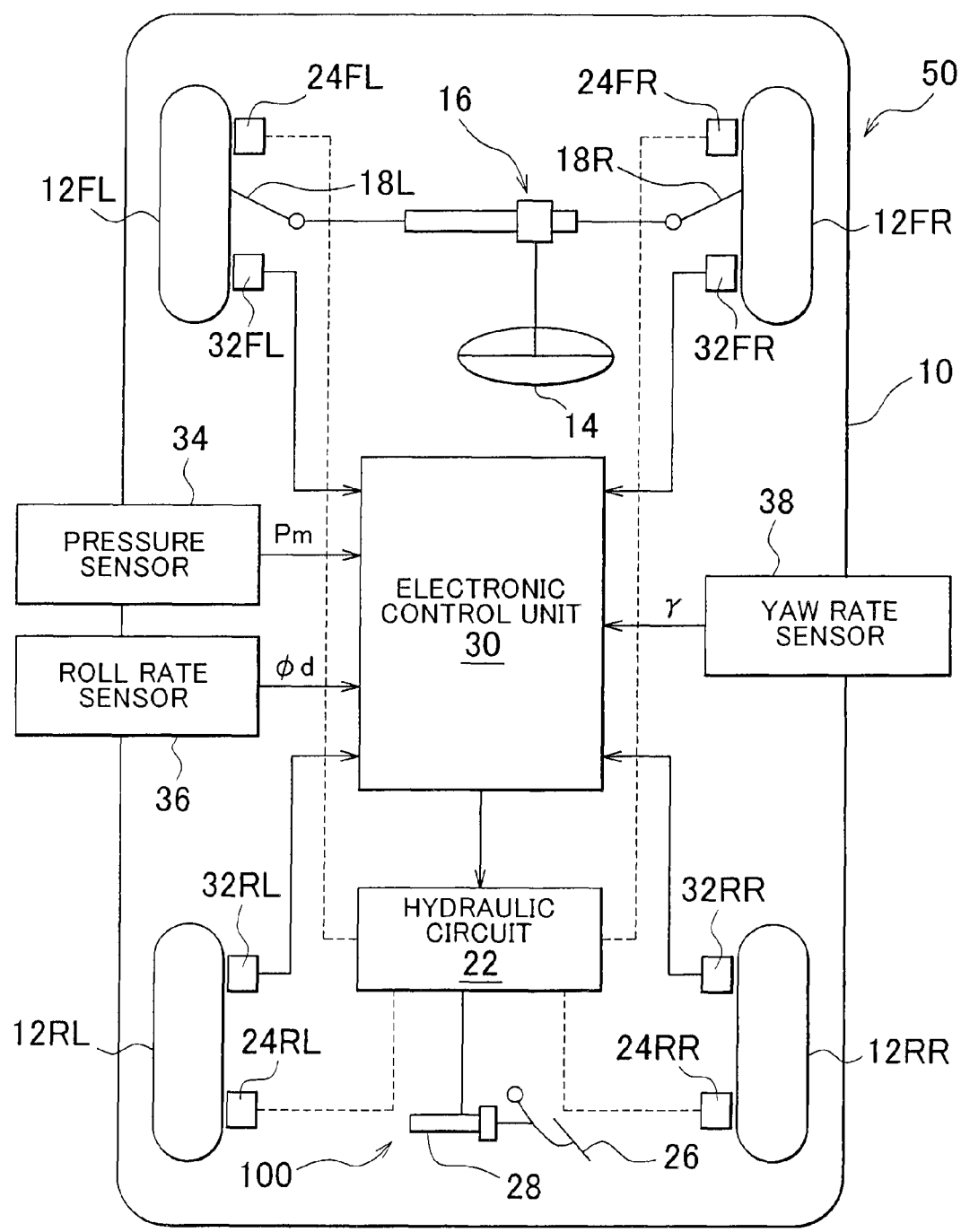
FIG. 1 is a schematic construction diagram showing a first embodiment of the braking force control apparatus for a vehicle of the invention.

FIG. 1 is a schematic construction diagram showing a first embodiment of the braking force control apparatus for a vehicle of the invention.

FIG. 1 shows an overall construction of a braking force control apparatus 50 of a vehicle 10. The vehicle 10 has left and right front wheels 12FL and 12FR and left and right rear wheels 12RL and 12RR. The left and right front wheels 12FL and 12FR, which are steered wheels, are steered, via tie rods 18L and 18R by a rack-and-pinion type power steering device 16 that is driven in response to a driver's steering operation of a steering wheel 14.

The pressures in wheel cylinders 24FR, 24FL, 24RR and 24RL, that is, the braking pressures for the wheels, is controlled by a hydraulic circuit 22 of a braking device 100, and thereby the braking forces of the wheels are controlled. Although not shown in the drawings, the hydraulic circuit 22 includes an oil reservoir, an oil pump, various valve devices, etc. The hydraulic circuit 22 is controlled by an electronic control unit 30 on the basis of the pressure in a master cylinder 28, that is, the master cylinder pressure Pm, and the like. The master cylinder pressure Pm is changed by a driver's depression operation of a brake pedal 26.

Each of the wheels 12 FR to 12RL are provided with a corresponding one of wheel speed sensors 32FR to 32RL that detect wheel speed Vwi (i=fr, fl, rr, rl). The master cylinder 28 is provided with a pressure sensor 34 that detects the master cylinder pressure Pm. Besides, the vehicle 10 is provided with a roll rate sensor 36 that detects the roll rate $\phi d$ of the vehicle, and a yaw rate sensor 38 that detects the yaw rate $\gamma$ of the vehicle. Signals that show values detected by the sensors are input to the electronic control unit 30. The roll rate sensor 36 detects the roll rate $\phi d$, with the positive direction defined as the direction in which the roll to the right of the vehicle increases. The yaw rate sensor 38 detects the yaw rate $\gamma$, with the positive direction defined as the direction in which the vehicle turns to the left.

Incidentally, although not shown in detail in the drawings, the electronic control unit 30 includes, for example, a microcomputer of an ordinary construction that has a CPU, a ROM, a RAM, a buffer memory and an input/output port device that are interconnected by a bidirectional common bus.

The electronic control unit 30 controls the braking pressures for the left and right front wheels on the basis of the master cylinder pressure Pm, and thereby controls the braking forces of the left and right front wheels according to the amount of operation of depressing the brake pedal 26, that is, the amount of the driver's braking operation. Besides, the electronic control unit 30 computes a target wheel speed Vwrt of the left and right rear wheels for suitably distributing the braking force to the front and rear wheels according to a flowchart shown in FIG. 2 as described in detail below.

Furthermore, the electronic control unit 30 computes a target wheel speed difference ΔVwrt between the left and right rear wheels for reducing the wobble of the vehicle that occurs because of a front-rear braking force distribution control that distributes a braking force to front wheels and rear wheels, on the basis of the roll rate φd of the vehicle. Besides, the electronic control unit 30 computes target wheel speeds Vwrlt and Vwrrt of the left and right rear wheels by correcting the target wheel speed Vwrt on the basis of the target wheel speed difference ΔVwrt between the left and right rear wheels. Then, the electronic control unit 30 controls the braking pressures for the left and right rear wheels individually so that each of the wheel speeds of the left and right rear wheels becomes equal to a value within a predetermined range that contains a corresponding one of the target wheel speeds Vwrlt and Vwrrt. Thus, the electronic control unit 30 performs the control so as to suitably distribute the braking force to the front and rear wheels while restraining the wobble of the vehicle.

Figure 2:
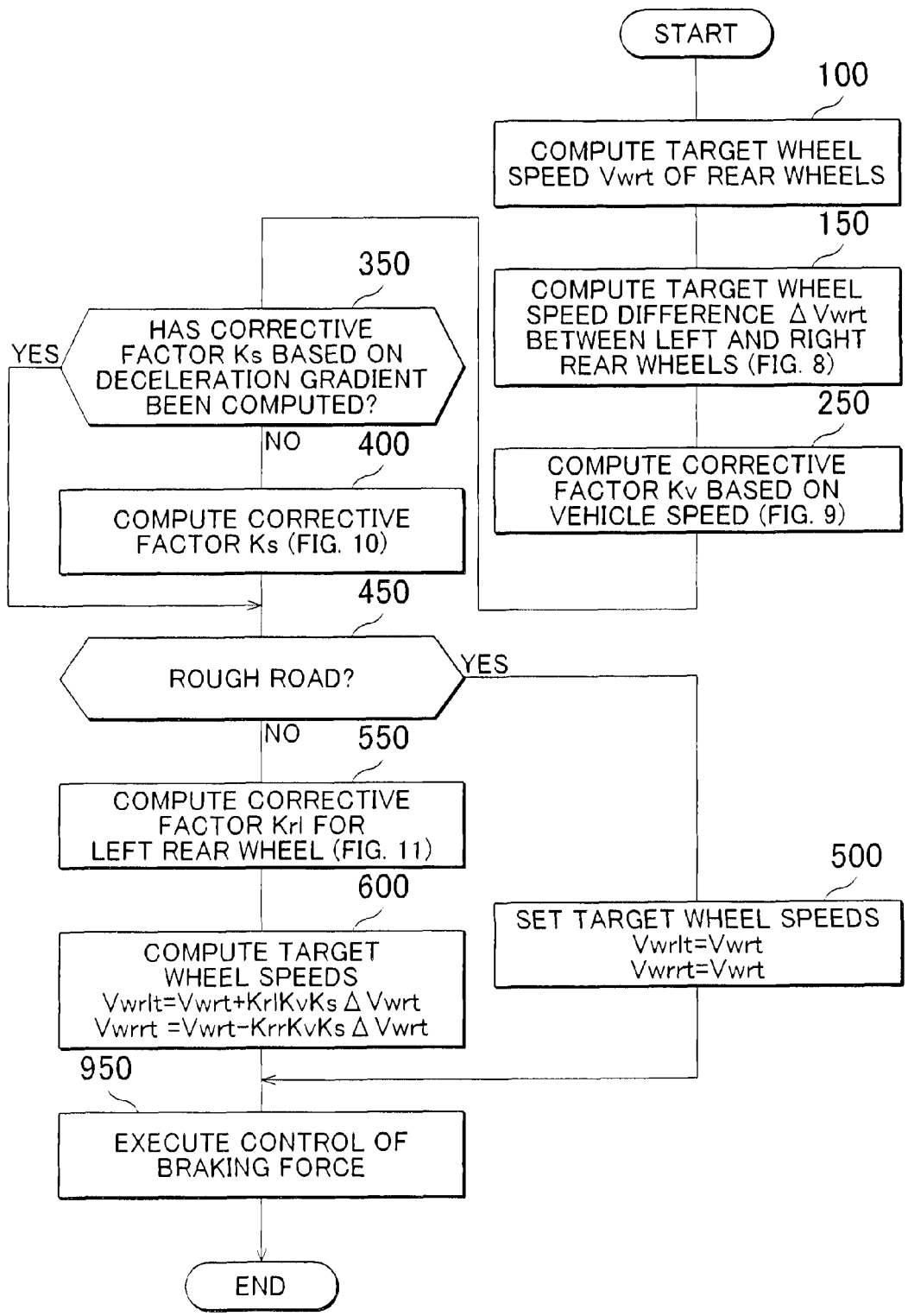
FIG. 2 is a flowchart showing a routine of the front-rear braking force distribution control in the first embodiment of the vehicle braking force control apparatus of the invention.

Next, a routine of a front-rear braking force distribution control in the first embodiment will be described with reference to a flowchart shown in FIG. 2. Incidentally, the control according to the flowchart shown in FIG. 2 is started when the master cylinder pressure Pm becomes equal to or greater than a control start criterion value Pms (a positive constant), and then is repeated at every predetermined time intervals until the master cylinder pressure Pm becomes equal to or less than a control end criterion value Pme (a positive constant).

Firstly, in step 100, a vehicle speed V is computed on the basis of the wheel speeds Vwi of the wheels, and a derivative value of the vehicle speed V is computed as a deceleration Vd of the vehicle. Besides, a target wheel speed difference ΔVwx of the rear wheels relative to the front wheels is computed on the basis of the vehicle speed V and the deceleration Vd of the vehicle. The target wheel speed difference ΔVwx is computed so as to be larger as the the vehicle speed V is greater, and so as to be larger as the deceleration Vd of the vehicle is greater. Then, a sum of the greater one of the wheel speeds of the left and right front wheels, that is, the wheel speed Vwfmax, and the target wheel speed difference ΔVwx is computed as a target wheel speed Vwrt of the rear wheel.

Figure 8:
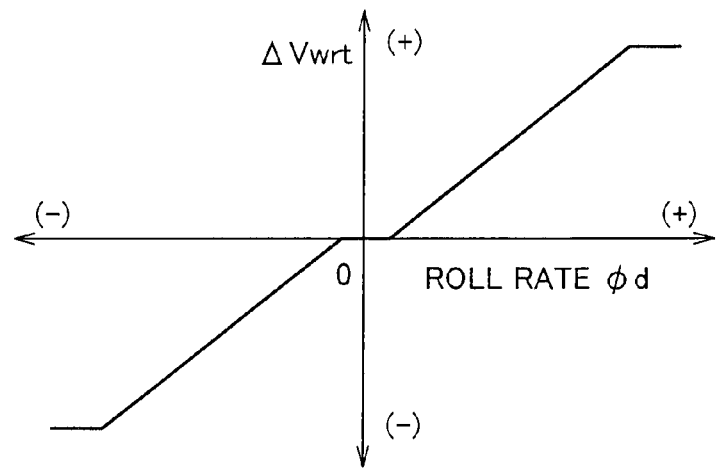
FIG. 8 is a graph showing a relation between the roll rate $\phi d$ of the vehicle and the target wheel speed difference $\Delta V w r t$.

In step 150, a target wheel speed difference ΔVwrt between the left and right rear wheels is computed using a map that corresponds to a graph shown in FIG. 8, on the basis of the roll rate φd of the vehicle. In this case, the target wheel speed difference ΔVwrt is computed so as to be a larger positive value as the roll rate φd of the vehicle is larger when the roll rate φd is positive value, and so as to be a smaller negative value as the magnitude of the roll rate φd is larger when the roll rate φd is negative value.

Figure 9:
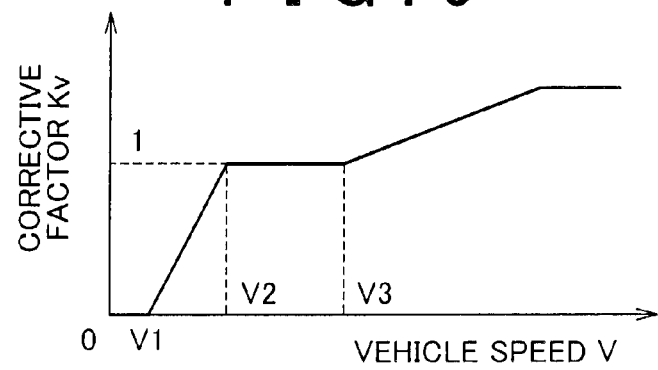
FIG. 9 is a graph showing a relation between the vehicle speed V and a corrective factor Kv based on the vehicle speed.

In step 250, a corrective factor Kv based on the vehicle speed is computed using a map that corresponds to a graph shown in FIG. 9, on the basis of the vehicle speed V. In this case, the corrective factor Kv is computed as 1 when the vehicle speed V is greater than or equal to a second reference value V2 (a positive constant) and is less than or equal to a third reference value V3 (a positive constant that is larger than V2), and is computed so as to be larger as the vehicle speed V is greater when the vehicle speed V is larger than the third reference value V3. Besides, when the vehicle speed V is greater than or equal to a first reference value V1 (a positive constant that is smaller than V2) and is less than the second reference value V2, the corrective value Kv is computed so as to be smaller as the vehicle speed V is smaller. When the vehicle speed V is less than the first reference value V1, the corrective factor Kv is computed as 0.

In step 350, it is determined whether or not a corrective factor Ks based on the deceleration gradient has already been computed. If an affirmative determination is made, the control proceeds to step 450. If a negative determination is made, the control proceeds to step 400.

Figure 10:
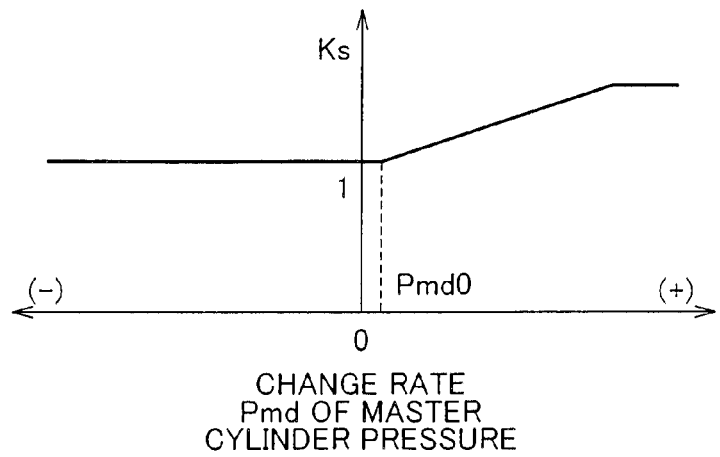
FIG. 10 is a graph showing a relation between the change rate Pmd of the master cylinder pressure and a corrective factor Ks based on the deceleration gradient.

In step 400, a change rate Pmd of the master cylinder pressure Pm is computed as a value that shows the deceleration gradient of the vehicle. Then, on the basis of the change rate Pmd of the master cylinder pressure, a corrective factor Ks based on the deceleration gradient is computed from a map that corresponds to a graph shown in FIG. 10. In this case, the corrective factor Ks is computed as 1 when the change rate Pmd of the master cylinder pressure is less than a reference value Pmd0 (a positive constant), and is computed so as to be larger as the change rate Pmd of the master cylinder pressure is larger when the change rate Pmd of the master cylinder pressure is greater than or equal to the reference value Pmd0.

In step 450, it is determined whether or not the present traveling road is a rough road. If a negative determination is made, the control proceeds to step 550. If an affirmative determination is made, the control proceeds to step 500.

Incidentally, the determination as to whether the present traveling road is a rough road may be carried out by an arbitrary method. For example, as described in Japanese Patent Application Publication No. 2-8677 (JP-A-2-8677), up-down displacements of the road surface may be detected, and it may be determined that the traveling road is a rough road when the frequency of the up-down displacements is greater than or equal to a specific value. Besides, as shown in Japanese Patent Application Publication No. 3-284463 (JP-A-3-284463), it may be determined that the traveling road is a rough road if the wheel deceleration during braking reaches or exceeds a large value a predetermined number of times or more within a predetermined length of time. Furthermore, as described in Japanese Patent Application Publication No. 2000-127936 (JP-A-2000-127936), it may be determined that the traveling road is a rough road when the cycle of fluctuation of the wheel speed and the peak value during a half the cycle satisfy set value values respectively.

In step 500, the target wheel speed Vwrlt of the left rear wheel and the target wheel speed Vwrrt of the right rear wheel are set at the target wheel speed Vwrt of the rear wheels computed in step 100, that is, a pre-correction target wheel speed of the rear wheels.

Figure 11:
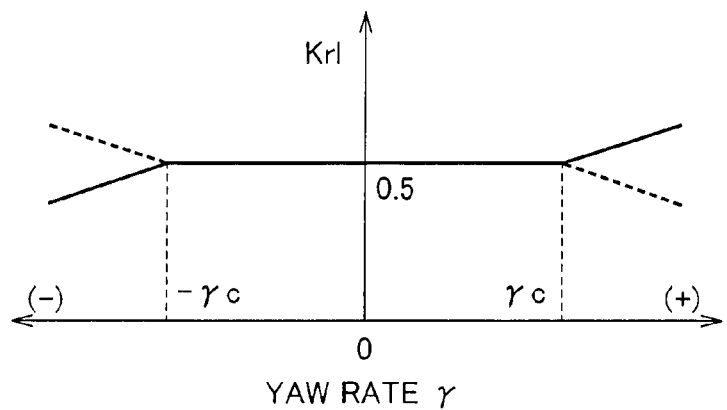
FIG. 11 is a graph showing a relation between the yaw rate $\gamma$ of the vehicle and a corrective factor Krl of a left rear wheel.

In step 550, a corrective factor Krl for the left rear wheel is computed from a map that corresponds to a graph shown by a solid line in FIG. 11, on the basis of the yaw rate γ of the vehicle, which is one of the indexes of the direction and magnitude of the amount of load shift in the transverse direction of the vehicle. In this case, the corrective factor Krl is computed as 0.5 when the yaw rate γ is greater than or equal to −γc (γc is a positive constant) and is less than or equal to γc. Besides, when the yaw rate γ is larger than γc, the corrective factor Krl is computed so as to be larger below 1 as the yaw rate γ is larger. When the yaw rate γ is less than −γc, the corrective factor Krl is computed so as to be a smaller positive value as the yaw rate γ is smaller, that is, as the absolute value of the yaw rate γ is larger.

In step 600, the target wheel speed Vwrlt of the left rear wheel and the target wheel speed Vwrrt of the right rear wheel are computed according to the following expressions 1 and 2. In the expression 2, a factor Krr is a corrective factor for the right rear wheel (Krr=1−Krl). Therefore, the corrective factor Krr for the right rear wheel may be computed using a map that corresponds to a graph shown by an interrupted line in FIG. 11.

$$Vwrlt = Vwrt + KrlKvKs\Delta Vwrt \quad (1)$$

$$Vwrrt = Vwrt - KrrKvKs\Delta Vwrt \quad (2)$$

In step 950, the braking pressures on the left and right rear wheels are controlled so that the wheel speeds of the left and right rear wheels are in a range equal to or greater than the target wheel speed Vwrlt−α (a positive constant) and less than or equal to Vwrlt+α, and a range equal to or greater than Vwrrt−α and less than or equal to Vwrlt+α, respectively. Thus, the braking forces applied the left and right rear wheels are controlled. That is, when the wheel speed of the left rear wheel is less than Vwrlt−α, the braking pressure for the left rear wheel is reduced. On the other hand, when the wheel speed of the left rear wheel is greater than Vwrlt+α, the braking pressure for the left rear wheel is increased. Likewise, when the wheel speed of the right rear wheel is less than Vwrrt−α, the braking pressure for the right rear wheel is reduced. On the other hand, when the wheel speed of the right rear wheel is greater than Vwrrt+α, the braking pressure for the right rear wheel is increased.

In the first embodiment, when the master cylinder pressure Pm becomes equal to or greater than the control start criterion value Pms after the driver starts a braking operation, the control according to the flowchart shown in FIG. 2 is started. Incidentally, when the master cylinder pressure Pm is less than the control start criterion value Pms, the braking pressures for the left and right rear wheels are controlled on the basis of the master cylinder pressure Pm, similarly to the braking pressures for the left and right front wheels.

Firstly in step 100, a target wheel speed difference ΔVwx of the rear wheels relative to the front wheels is computed, and the sum of the greater wheel speed Vwfmax of the wheel speeds of the left and right front wheels and the target wheel speed difference ΔVwx is computed as a target wheel speed Vwrt of the rear wheels.

In step 150, the target wheel speed difference ΔVwrt between the left and right rear wheels is computed using the map that corresponds to the graph shown in FIG. 8 so that the magnitude of the target wheel speed difference ΔVwrt is greater as the magnitude of the roll rate φd of the vehicle is greater.

In step 250, basically, the corrective factor Kv based on the vehicle speed is computed so as to be greater as the vehicle speed V is greater. Furthermore, in step 400, basically, the corrective factor Ks based on the deceleration gradient of the vehicle is computed so as to be greater as the deceleration gradient of the vehicle is greater.

When the traveling road is not a rough road, a negative determination is made in step 450, so that in step 550, the corrective factor Krl for the left rear wheel is computed on the basis of the yaw rate γ.

Then in step 600, the target wheel speed Vwrlt of the left rear wheel and the target wheel speed Vwrrt of the right rear wheel are computed according to the foregoing expressions 1 and 2. Furthermore, in step 950, the braking pressures for the left and right rear wheels are controlled so that each of the wheel speeds of the left and right rear wheels are in the predetermined range that contains a corresponding one of the target wheel speeds Vwrlt and Vwrrt.

Therefore, according to the first embodiment, the distribution of braking force to the front and rear wheels and the distribution of braking force to the left and right rear wheels can be controlled so that the braking force is suitably distributed to the rear wheels corresponding to the target wheel speed difference ΔVwx, with respect to the braking forces applied to the front wheels, and so that the braking force is suitably distributed to the left and right rear wheels corresponding to the target wheel speed difference ΔVwrt.

In this case, the target wheel speed difference ΔVwrt between the left and right rear wheels is computed in step 150 using the map that corresponds to the graph shown in FIG. 8, on the basis of the roll rate φd of the vehicle that is advanced in phase relative to the roll angle of the vehicle, the yaw rate γ thereof, etc.

Therefore, the braking forces of the left and right rear wheels can be corrected by a correction amount that is advanced in phase relative to the change in the ground contact loads of the left and right rear wheels caused by a load shift in the transverse direction of the vehicle. Hence, the wobble of the vehicle in the front-rear braking force distribution control can be effectively reduced, and the deterioration of the wobbling and the roll of the vehicle resulting from a control lag can be effectively restrained.

For example, FIGS. 14A to 14D and FIGS. 15A to 15D are graphs showing examples of changes in the vehicle speed V, the yaw rate γ of the vehicle, the deceleration Vd of the vehicle, braking pressures Pfl to Prr for the wheels in the case where the vehicle is braked while traveling straight, with regard to a conventional braking force control apparatus and the first embodiment of the invention.

Figure 14A:
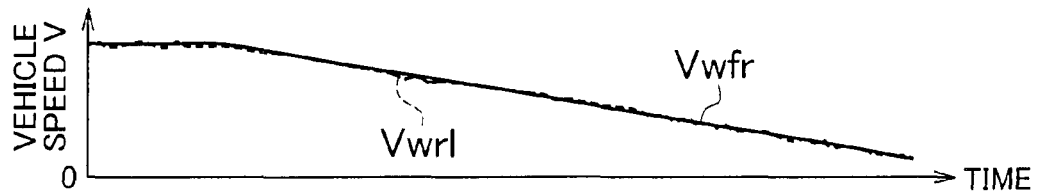
FIGS. 14A to 14D are graphs showing examples of changes in the the vehicle speed V, the yaw rate $\gamma$ of the vehicle, the deceleration Vd of the vehicle, and the braking pressures Pfl to Prr for the wheels in a conventional braking force control apparatus.
Figure 14B:
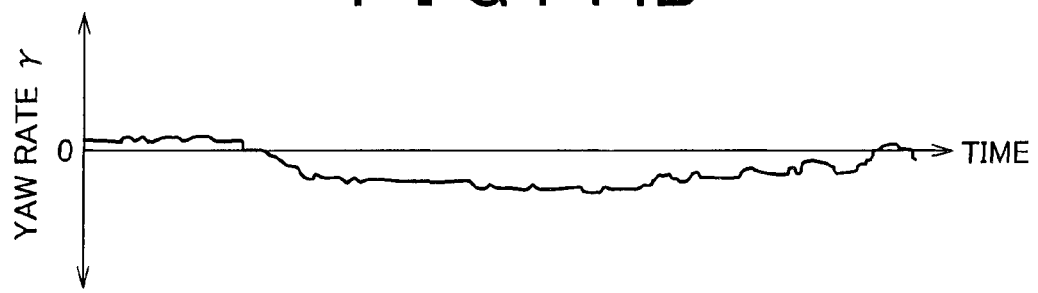
Figure 14C:
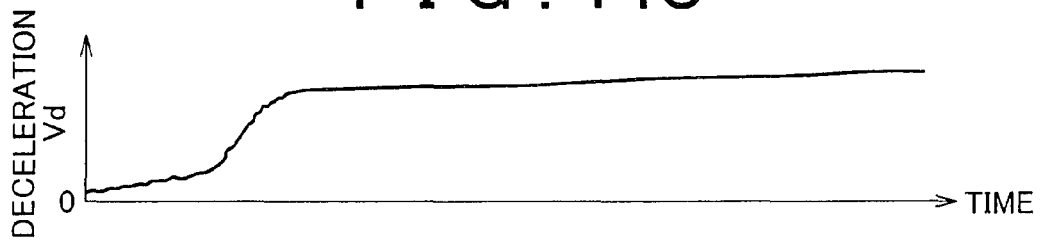
Figure 14D:
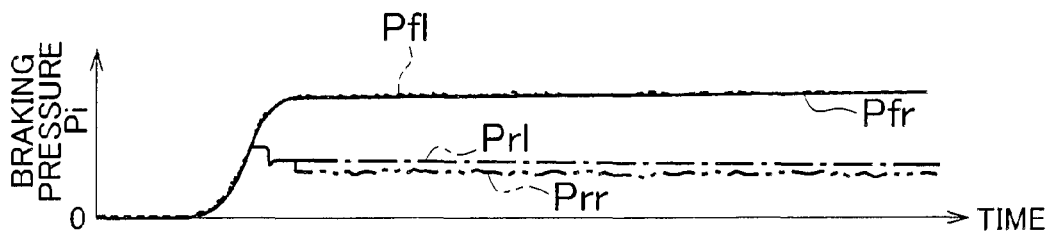
Figure 15A:
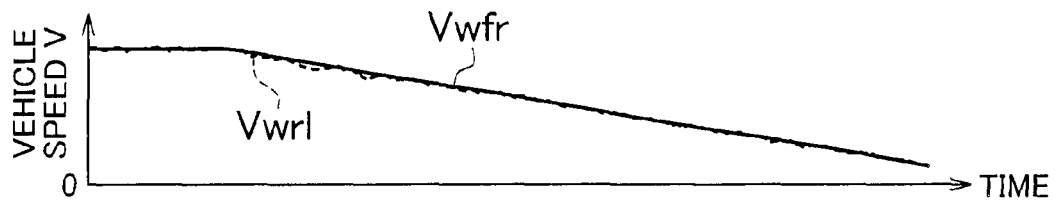
FIGS. 15A to 15D are graphs showing examples of changes in the vehicle speed V, the yaw rate $\gamma$ of the vehicle, the deceleration Vd of the vehicle, and the braking pressures Pfl to Prr for the wheels in the first embodiment.
Figure 15B:
Figure 15C:
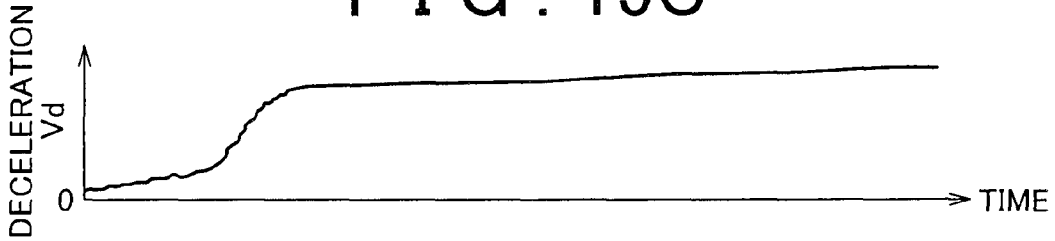
Figure 15D:
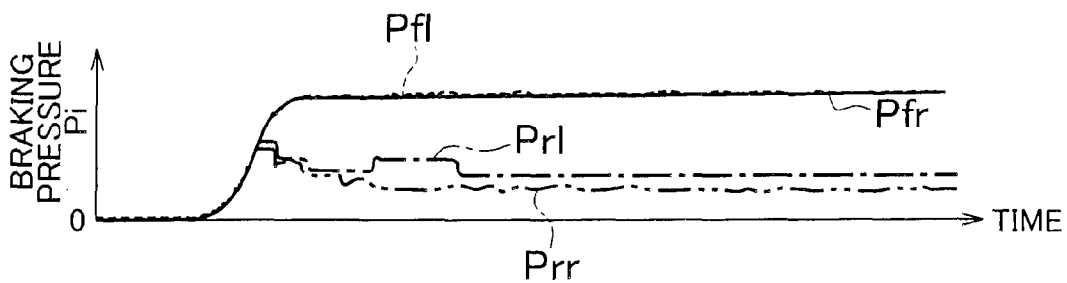

As shown in FIG. 14D, in the case of the related-art braking force control apparatus, when the braking of the vehicle starts, the braking pressure for each wheel increases. However, due to the front-rear braking force distribution control, the braking pressures Prl and Prr for the left and right rear wheels are kept lower than the braking pressures Pfl and Pfr for the left and right front wheels. Besides, as shown in FIGS. 14A and 14C, the deceleration Vd of the vehicle becomes substantially constant after increasing, and the vehicle speed V gradually declines. For example, in the case of a vehicle whose driver's seat is on the left side and therefore the center of gravity thereof is usually on the left side of the center of the vehicle, the braking forces applied to the right wheels whose supporting loads are smaller are greater than the braking forces applied to the left-side wheels, even though the braking pressures for the left wheels and for the right wheels are equal. As a result, the vehicle tends to turn to the right, and a yaw rate γ in the right turn direction which is relatively large in magnitude occurs on the vehicle as shown in FIG. 14B.

Since the vehicle tends to turn to the right, the wheel speed Vwrl of the left rear wheel, which is the outer rear wheel during the turning, is greater than the wheel speed Vwrr of the right rear wheel, which is the inner rear wheel during the turning. Therefore, the braking pressure Prl for the left rear wheel is controlled to a value that is slightly higher than the braking pressure Prr for the right rear wheel so that the braking slips (the degrees of slip during braking) of the left and right rear wheels become equal by the front-rear braking force distribution control. Hence, the magnitude of the yaw rate γ of the vehicle gradually decreases even though the driver does not perform a steering operation.

If the magnitude of the yaw rate γ of the vehicle decreases, the difference in wheel speed between the left and right rear wheels also decreases, and then the difference in braking force between the left and right rear wheels caused by the front-rear braking force distribution control also decreases. Accordingly, because of the braking force difference caused by difference in the ground contact load between the left and right wheels, the vehicle comes to turn to the right again. As the foregoing phenomenon repeatedly occurs, the magnitude of the yaw rate γ of the vehicle repeatedly changes, and therefore the vehicle wobbles.

In contrast to the above-described conventional braking force control apparatus, in the first embodiment shown in FIG. 15A-15D, after the vehicle starts to be braked, the deceleration Vd of the vehicle increases and the vehicle speed V gradually declines, but the vehicle substantially does not turn and a yaw rate γ of a great magnitude does not occur on the vehicle. Hence, the yaw rate γ of the vehicle does not greatly fluctuates, and therefore the vehicle does not wobble.

The wobble of the vehicle can be restrained in the above-described manner, because the difference in braking force between the left and right rear wheels restrains the occurrence of unintended yaw rate γ of the vehicle and changes in such unintended yaw rate γ without a delay, by the left-right braking force distribution control that distribute the braking force to the left and right wheels based on the roll rate φd of the vehicle in addition to the front-rear braking force distribution control. This effect is apparent when a change in the yaw rate γ of the vehicle in FIG. 14B and a change in the braking pressures Prl and Prr of the left and right rear wheels in FIG. 14D are compared to a change in the yaw rate γ of the vehicle in FIG. 15B and a change in the braking pressures Prl and Prr of the left and right rear wheels in FIG. 15D, respectively.

Besides, according to the first embodiment, in step 250, the corrective factor Kv based on vehicle speed is computed using the map that corresponds to the graph shown in FIG. 9 so that the corrective factor Kv is basically larger as the vehicle speed V is greater. Then, in step 600, by using the corrective factor Kv, the target wheel speed Vwrlt of the left rear wheel and the target wheel speed Vwrrt of the right rear wheel are computed.

Therefore, the wobble of the vehicle during the front-rear braking force distribution control, which is more conspicuous as the vehicle speed is higher, can be effectively reduced irrespective of the vehicle speed, and the correction amounts for the target wheel speeds of the left and right rear wheels can be restrained from becoming excessively large in a low-vehicle speed region. Incidentally, the foregoing function and effect can also be similarly attained in the third, fifth and sixth embodiments described below.

Besides, according to the first embodiment, in steps 550 and 600, when the magnitude of the yaw rate γ of the vehicle is less than or equal to γc, the corrective factor Krl of the left rear wheel and the corrective factor Krr of the right rear wheel are both set at 0.5. Hence, since the magnitude of the increasing correction amount (positive correction amount) that increases the target wheel speed of one of the left and right rear wheels is equal to the magnitude of the decreasing correction amount (negative correction amount) that decreases the target wheel speed of the other of the left and right rear wheels, the sum of the target wheel speeds of the left and right rear wheels is not changed by the correction of the target wheel speeds. Consequently, the correction of the target wheel speeds of the left and right rear wheels can be more restrained from giving adverse effects to the front-rear braking force distribution control. Incidentally, the foregoing function and effect can also be similarly attained in the second embodiment below.

Besides, according to the first embodiment, the corrective factor Krl for the left rear wheel is computed so as to be a larger value below 1 as the yaw rate γ is larger when the yaw rate γ is larger than γc, and so as to be a smaller positive value as the yaw rate γ is smaller, that is, as the absolute value thereof is larger, when the yaw rate γ is less than −γc. Hence, in a situation where the absolute value of the yaw rate γ is large, the magnitude of the correction amount for the target wheel speed of the rear wheel on the side of greater ground contact load can be enlarged, and the magnitude of the correction amount for the target wheel speed of the rear wheel on the side of smaller ground contact load can be lessened. Consequently, the correction amount for the target wheel speed can be variably set (changed) on the basis of both the amount of load shift in the vehicle transverse direction and the change rate of the amount of load shift. The foregoing function and effect can also be similarly attained in the second embodiment described below.

Second Embodiment

Figure 3:
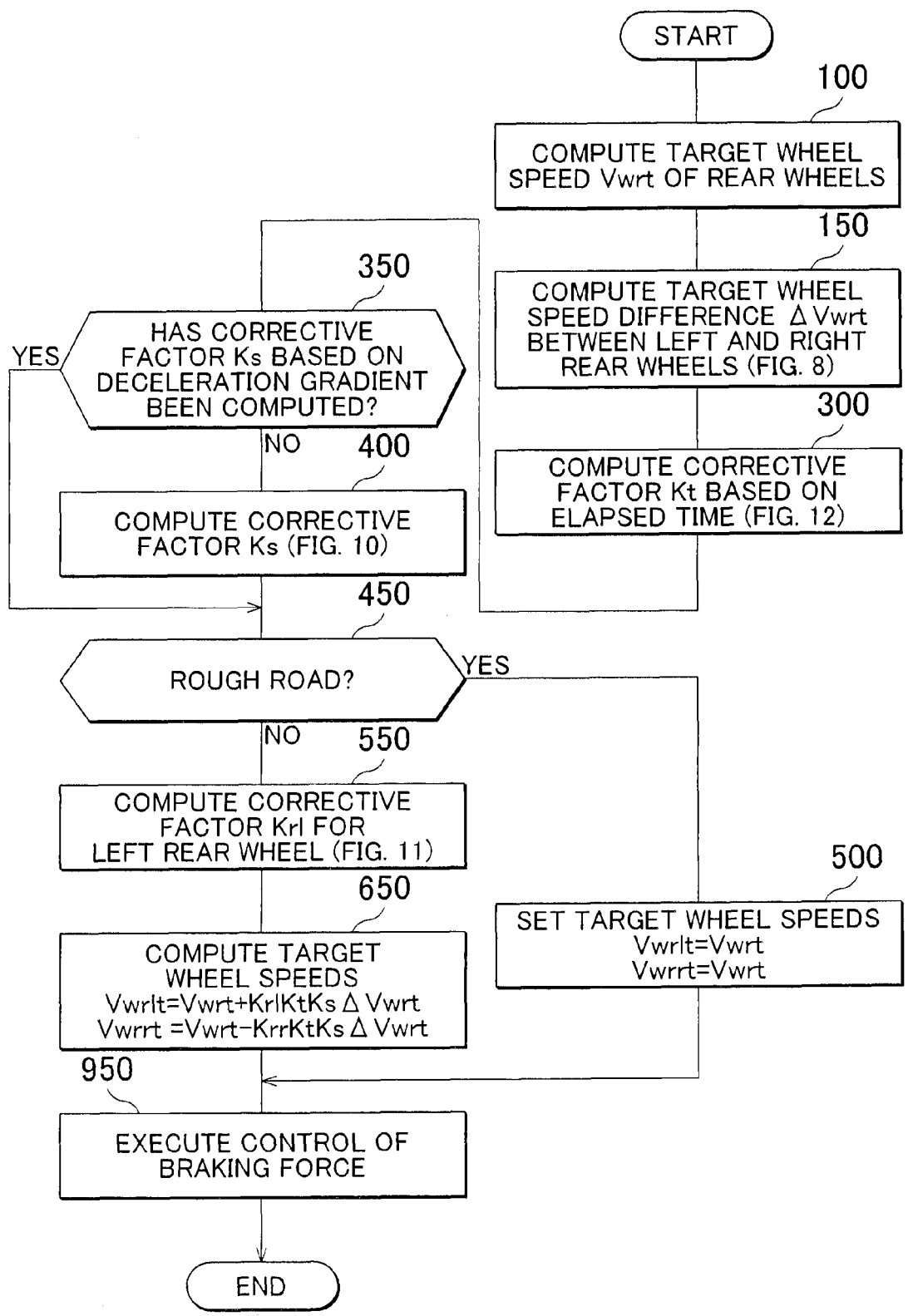
FIG. 3 is a flowchart showing a routine of the front-rear braking force distribution control in a second embodiment of the vehicle braking force control apparatus of the invention.

FIG. 3 is a flowchart showing a routine of the front-rear braking force distribution control in the second embodiment of the vehicle braking force control apparatus of the invention. Incidentally, in FIG. 3, the same steps as those shown in FIG. 2 are denoted by the same step numbers as those used in FIG. 2. This applies in conjunction with the other embodiments described below.

In the second embodiment, after step 150 is completed, step 300 is executed instead of step 250. After step 300 is completed, the control proceeds to step 350. After step 550 is completed, step 650 is executed instead of step 600. The other steps in the second embodiment are executed in substantially the same manner as in the first embodiment.

Figure 12:
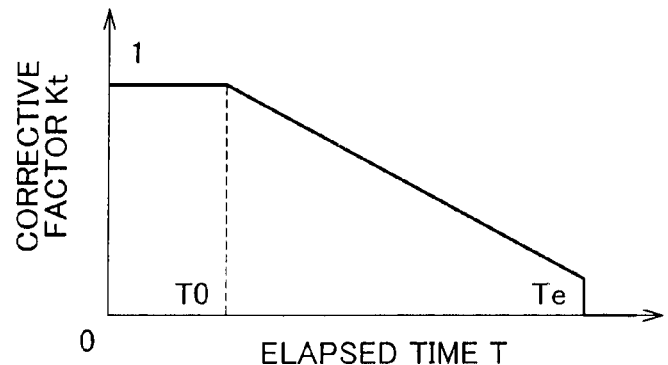
FIG. 12 is a graph showing a relation between the elapsed time T following a time point at which the front-rear braking force distribution control is started and a corrective factor Kt based on the elapsed time.

In step 300, on the basis of the elapsed time T from a time point at which the front-rear braking force distribution control is started, a corrective factor Kt based on the elapsed time is computed using a map that corresponds to a graph shown in FIG. 12. In this case, when the elapsed time T is less than a reference value T0 (a positive constant), the corrective factor Kt is computed as 1, and when the elapsed time T is equal to or greater than the reference value T0, the corrective factor Kt is computed so as to be smaller as the elapsed time T is longer. Besides, when the elapsed time T is greater than or equal to a reference value Te (a positive constant larger than T0), the corrective factor Kt is computed as 0.

In step 650, a target wheel speed Vwrlt of the left rear wheel and a target wheel speed Vwrrt of the right rear wheel are computed according to the following expressions 3 and 4.

$$Vwrlt = Vwrt + KrlKtKs\Delta Vwrt \quad (3)$$

$$Vwrrt = Vwrt - KrrKtKs\Delta Vwrt \quad (4)$$

As can be understood from the foregoing description, according to the second embodiment, the braking forces applied to the left and right rear wheels can be corrected by correction amounts that are advanced in phase relative to the load shift in the vehicle transverse direction, as in the first embodiment. Hence, the wobble of the vehicle during the front-rear braking force distribution control can be effectively reduced, and the deterioration of the wobbling and the roll of the vehicle resulting from a control lag can be restrained.

In particular, in the second embodiment, in step 300, the corrective factor Kt based on elapsed time is computed using the map that corresponds to the graph shown in FIG. 12, on the basis of the elapsed time T from the time point at which the front-rear braking force distribution control is started. Then, in step 650, by using the corrective factor Kt based on elapsed time instead of the corrective factor Kv based on vehicle speed, the target wheel speed Vwrlt of the left rear wheel and the target wheel speed Vwrrt of the right rear wheel are computed.

In general, the wobble of the vehicle during the front-rear braking force distribution control is gentler as the vehicle speed V is lower. On another hand, the vehicle speed V gradually declines as the braking of the vehicle continues, that is, as the elapsed time T from the time point at which the front-rear braking force distribution control is started increases. Therefore, according to the second embodiment, the wobble of the vehicle at the time of start of the front-rear braking force distribution control when the vehicle speed is high can be effective reduced, and the correction amounts for the braking forces distributed to the left and right rear wheels can be gradually lessened as the front-rear braking force distribution control progresses. Incidentally, the foregoing operation and effect can also be attained in the fourth embodiment described below.

Third Embodiment

Figure 4:
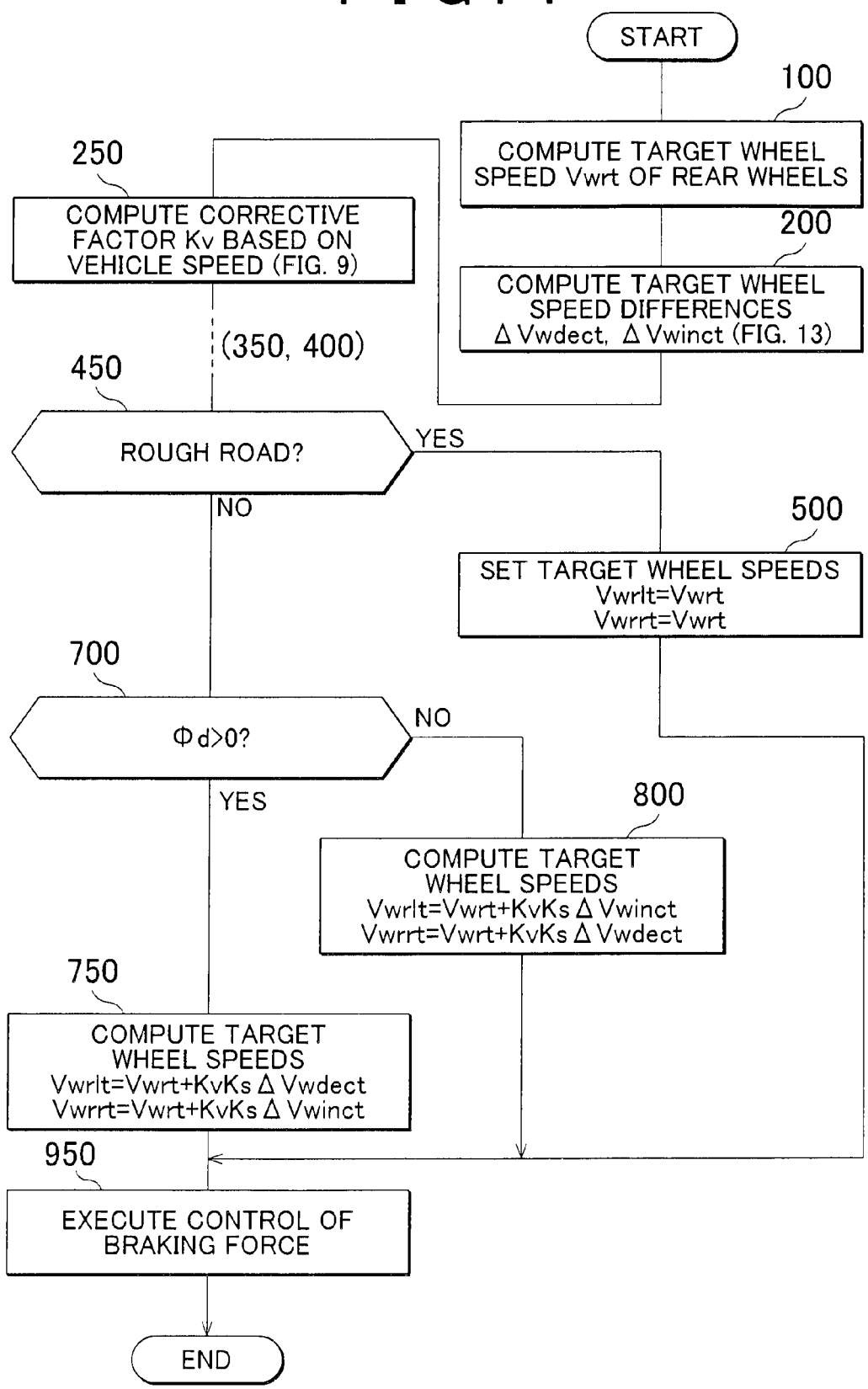
FIG. 4 is a flowchart showing a routine of the front-rear braking force distribution control in a third embodiment of the vehicle braking force control apparatus of the invention.

FIG. 4 is a flowchart showing a routine of the front-rear braking force distribution control in the third embodiment of the vehicle braking force control apparatus of the invention.

In the third embodiment, after step 100 is completed, step 200 is executed instead of step 150. After step 200 is completed, the control proceeds to step 250. Steps 250 to 500 and step 950 are executed in substantially the same manner as in the above-described first embodiment.

Figure 13:
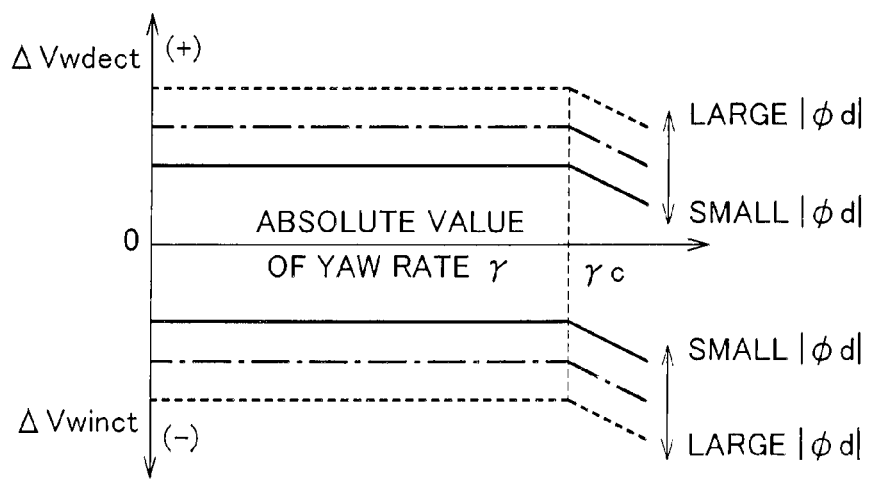
FIG. 13 is a graph showing relations of the target wheel speed difference $\Delta V w i n c t$ of the wheel on the ground contact load increase side and the target wheel speed difference $\Delta V w d e c t$ of the wheel on the ground contact load decrease side with the absolute value of the roll rate $\phi d$ of the vehicle and the absolute value of the yaw rate $\gamma$.

In step 200, a target wheel speed difference ΔVwinct of the rear wheel on a ground contact load increase side and a target wheel speed difference ΔVwdect of the rear wheel on a ground contact load decrease side are computed as a negative value and a positive value, respectively, from a map that corresponds to a graph shown in FIG. 13. These target wheel speed differences are computed so as to be larger in magnitude as the absolute value of the roll rate Δd of the vehicle is larger. Besides, in the case where the absolute value of the roll rate Δd of the vehicle remains the same, when the absolute value of the yaw rate γ of the vehicle is less than or equal to a reference value γc, the magnitudes of the target wheel speed differences ΔVwinct and ΔVwdect are equal to each other.

Furthermore, when the absolute value of the yaw rate γ is larger than the reference value γc, the magnitude of the target wheel speed difference ΔVwinct is smaller as the absolute value of the yaw rate γ is larger, and the magnitude of the target wheel speed difference ΔVwdect is larger as the absolute value of the yaw rate γ is larger. In a region where the absolute value of the yaw rate γ of the vehicle is small, the magnitudes of the target wheel speed differences ΔVwinct and ΔVwdect may be set so as to be smaller as the absolute value of yaw rate γ is smaller.

Besides, the sum of the absolute values of the target wheel speed differences ΔVwinct and ΔVwdect when the absolute value of the yaw rate γ is less than or equal to the reference value γc may be equal to the target wheel speed difference ΔVwrt in the above-described first and second embodiments provided that the absolute value of the roll rate φd remains the same.

Besides, in the third embodiment, if a negative determination is made in step 450, the control proceeds to step 700. In step 700, it is determined whether or not the roll rate φd of the vehicle is a positive value, that is, whether or not the load shift in the vehicle transverse direction is changing in the rightward direction. If a negative determination is made in step 700, the control proceeds to step 800. If an affirmative determination is made in step 700, the control proceeds to step 750.

In step 750, since the left rear wheel is the rear wheel on the ground contact load decrease side and the right rear wheel is the rear wheel on the ground contact load increase side, the target wheel speed Vwrlt of the left rear wheel and the target wheel speed Vwrrt of the right rear wheel are computed according to the following expressions 5 and 6.

$$Vwrlt = Vwrt + KvKs\Delta Vwdect \tag{5}$$

$$Vwrrt = Vwrt + KvKs\Delta Vwinct \tag{6}$$

In step 800, since the left rear wheel is the rear wheel on the ground contact load increase side and the right rear wheel is the rear wheel on the ground contact load decrease side, the target wheel speed Vwrlt of the left rear wheel and the target wheel speed Vwrrt of the right rear wheel are computed according to the following expressions 7 and 8. Incidentally, after step 750 or 800 is completed, the control proceeds to step 950.

$$Vwrlt = Vwrt + KvKs\Delta Vwinct \tag{7}$$

$$Vwrrt = Vwrt + KvKs\Delta Vwdect \tag{8}$$

According to the third embodiment, in step 200, the target wheel speed difference ΔVwinct of the rear wheel on the ground contact load increase side and the target wheel speed difference ΔVwdect of the rear wheel on the ground contact load decrease side are computed on the basis of the absolute value of the roll rate φd of the vehicle and the absolute value of the yaw rate γ of the vehicle. Then, according to the result of determination regarding the direction in which the load shift in the vehicle transverse direction changes in step 700, the target wheel speeds Vwrlt and Vwrrt of the left and right rear wheels are computed in step 750 or 800 so that the target wheel speed of the rear wheel on the ground contact load increase side becomes less than the target wheel speed of the rear wheel on the ground contact load decrease side.

Therefore, according to the third embodiment, the braking forces applied to the left and right rear wheels can be corrected by correction amounts that are advanced in phase relative to the load shift in the vehicle transverse direction, as in the first and second embodiments. Hence, the wobble of the vehicle during the front-rear braking force distribution control can be effectively reduced, and the deterioration of the wobbling and the roll of the vehicle resulting from a control lag can be restrained.

In particular, according to the third embodiment, as shown in FIG. 13, in the case where the absolute value of the roll rate φd of the vehicle remains the same, the target wheel speed differences ΔVwinct and ΔVwdect are equal to each other in magnitude. Hence, since the magnitude of the increasing correction amount (positive correction amount) that increases the target wheel speed of one of the left and right rear wheels is equal to the magnitude of the decreasing correction amount (negative correction amount) that decreases the target wheel speed of the other of the left and right rear wheels, the sum of the target wheel speeds of the left and right rear wheels is not changed by the correction of the target wheel speeds. Therefore, the correction of the target wheel speeds of the left and right rear wheels can be restrained from giving adverse effect on the front-rear braking force distribution control. Incidentally, the foregoing function and effect can also be similarly attained in the fourth and sixth embodiments described below.

Besides, according to the third embodiment, in the case where the absolute value of the yaw rate γ is larger than γc, the magnitude of the target wheel speed difference ΔVwinct is larger and the magnitude of the target wheel speed difference ΔVwdect is smaller as the absolute value of the yaw rate γ is larger. Hence, in a situation where the absolute value of the yaw rate γ is large and the amount of load shift in the vehicle transverse direction is large, the magnitude of the correction amount for the target wheel speed of the rear wheel on the ground contact load increase side can be enlarged and the magnitude of the correction amount for the target wheel speed of the rear wheel on the ground contact load decrease side can be lessened. Incidentally, the foregoing function and effect can also be similarly attained in the fourth and sixth embodiments described below.

Fourth Embodiment

Figure 5:
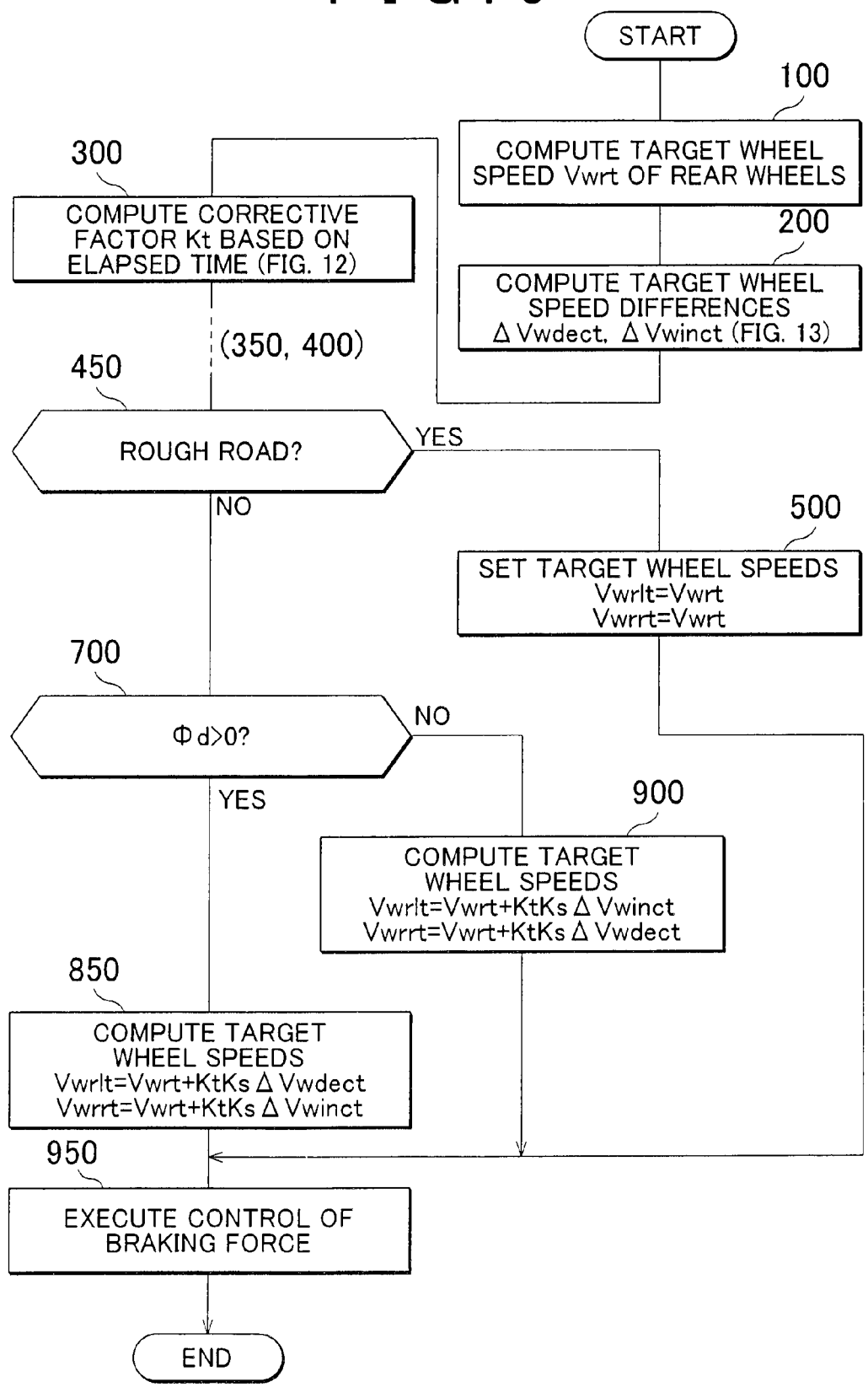
FIG. 5 is a flowchart showing a routine of the front-rear braking force distribution control in a fourth embodiment of the vehicle braking force control apparatus of the invention.

FIG. 5 is a flowchart showing a routine of the front-rear braking force distribution control in the fourth embodiment of the vehicle braking force control apparatus of the invention.

In the fourth embodiment, after the step 200 is completed, step 300 is executed instead of step 250.

Besides, if a negative determination is made in step 700, the control proceeds to step 900. On the other hand, if an affirmative determination is made in step 700, the control proceeds to step 850.

In step 850, the target wheel speed Vwrlt of the left rear wheel and the target wheel speed Vwrrt of the right rear wheel are computed according to the following expressions 9 and 10.

$$Vwrlt = Vwrt + KtKs\Delta Vwdect \tag{9}$$

$$Vwrrt = Vwrt + KtKs\Delta Vwinct \tag{10}$$

In step 900, the target wheel speed Vwrlt of the left rear wheel and the target wheel speed Vwrrt of the right rear wheel are computed according to the following expressions 11 and 12.

$$Vwrlt = Vwrt + KtKs\Delta Vwinct \tag{11}$$

$$Vwrrt = Vwrt + KtKs\Delta Vwdect \tag{12}$$

As can be understood from the comparison between FIG. 4 and FIG. 5, the other steps in the fourth embodiment are executed in substantially the same manner as in the foregoing third embodiment.

According to the fourth embodiment, the target wheel speeds Vwrlt and Vwrrt of the left and right rear wheels are computed in substantially the same manner as in the third embodiment, except that the corrective factor Kv based on the vehicle speed is replaced with the corrective factor Kt based on the elapsed time T as in the second embodiment.

Therefore, the wobble of the vehicle during the front-rear braking force distribution control can be effectively reduced, and deterioration of the wobbling and the roll of the vehicle resulting from a control lag can be restrained. Furthermore, substantially the same function and effect as in the foregoing second and third embodiments can be attained.

Fifth Embodiment

Figure 6:
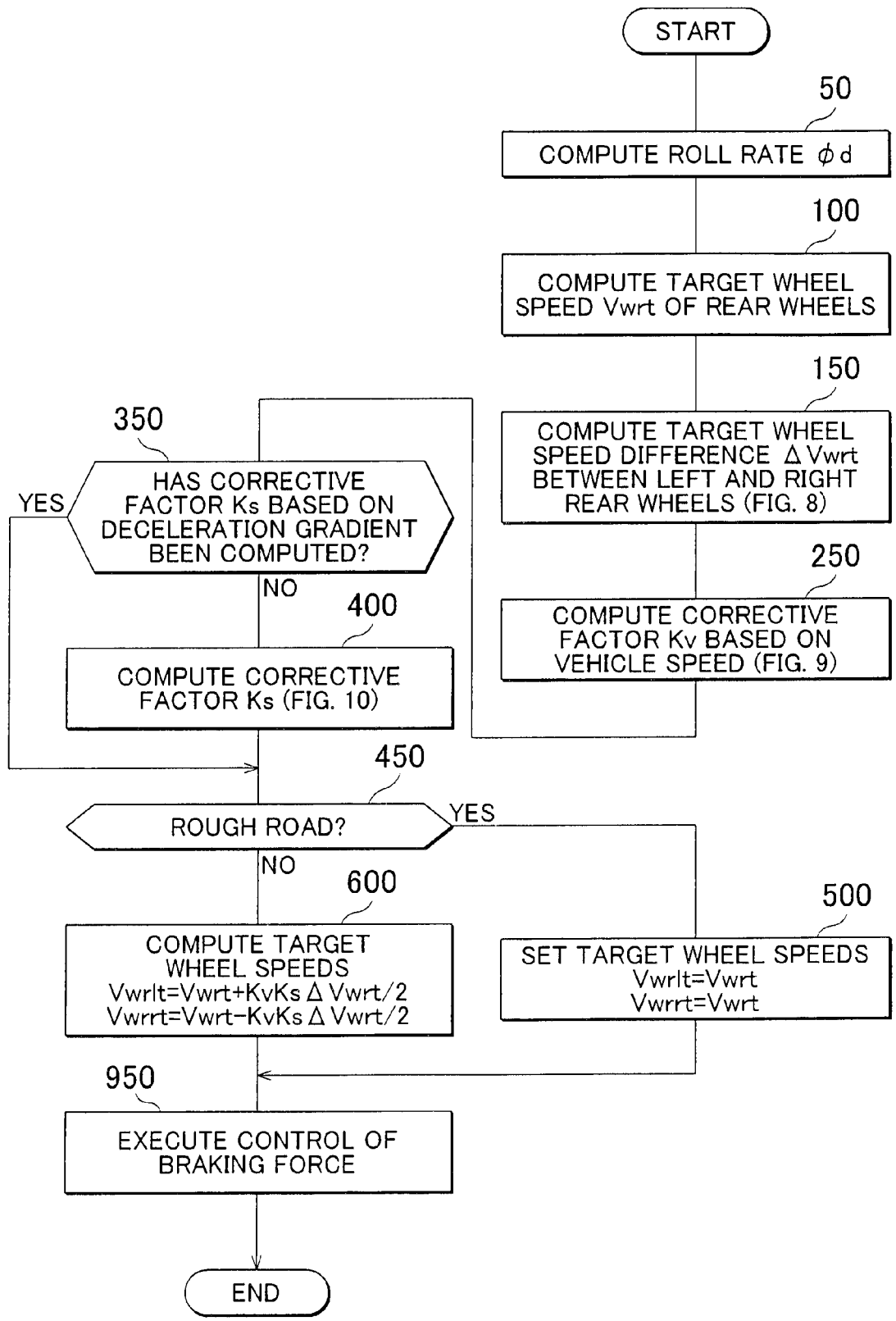
FIG. 6 is a flowchart showing a routine of the front-rear braking force distribution control in a fifth embodiment of the vehicle braking force control apparatus of the invention which is constructed as a modification of the first embodiment.

FIG. 6 is a flowchart showing a routine of the front-rear braking force distribution control in the fifth embodiment of the vehicle braking force control apparatus of the invention which is constructed as a modification of the first embodiment.

In the fifth embodiment, as can be understood from the comparison between FIG. 2 and FIG. 6, step 50 is executed prior to step 100, and the other steps, that is, steps 100 to 500 and step 950 are executed in substantially the same manner as in the foregoing first embodiment.

In step 50, the yaw rate γ of the vehicle is computed on the basis of the wheel speeds Vwi of the wheel, and the roll rate φd of the vehicle is computed on the basis of a derivative value of the computed yaw rate γ. Then in step 150, on the basis of the computed roll rate φd of the vehicle, the target wheel speed difference ΔVwrt between the left and right rear wheels is computed using the map that corresponds to the graph shown in FIG. 8.

Therefore, according to the fifth embodiment, substantially the same function and effect as in the first embodiment can be attained, and furthermore, since there is no need for a sensor that detects the roll rate φd of the vehicle, the cost of the braking force control apparatus can be reduced in comparison with the first embodiment. Besides, in the fifth embodiment, step 550 in the foregoing first embodiment is not executed, but the target wheel speed Vwrlt of the left rear wheel and the target wheel speed Vwrrt of the right rear wheel are computed according to the following expressions 13 and 14.

$$Vwrlt = Vwrt + KvKs\Delta Vwrt/2 \tag{13}$$

$$Vwrrt = Vwrt - KvKs\Delta Vwrt/2 \tag{14}$$

Therefore, according to the fifth embodiment, the magnitude of the increasing correction amount (positive correction amount) that increases the target wheel speed of one of the left and right rear wheels can be equal to the magnitude of the decreasing correction amount (negative correction amount) that decreases the target wheel speed of the other of the left and right rear wheels, irrespective of the yaw rate γ of the vehicle. Hence, the sum of the target wheel speeds of the left and right rear wheels is not changed by the correction of the target wheel speed. Therefore, the correction of the target wheel speeds of the left and right rear wheels can be restrained from giving adverse effect on the front-rear braking force distribution control, irrespective of the yaw rate γ.

Sixth Embodiment

Figure 7:
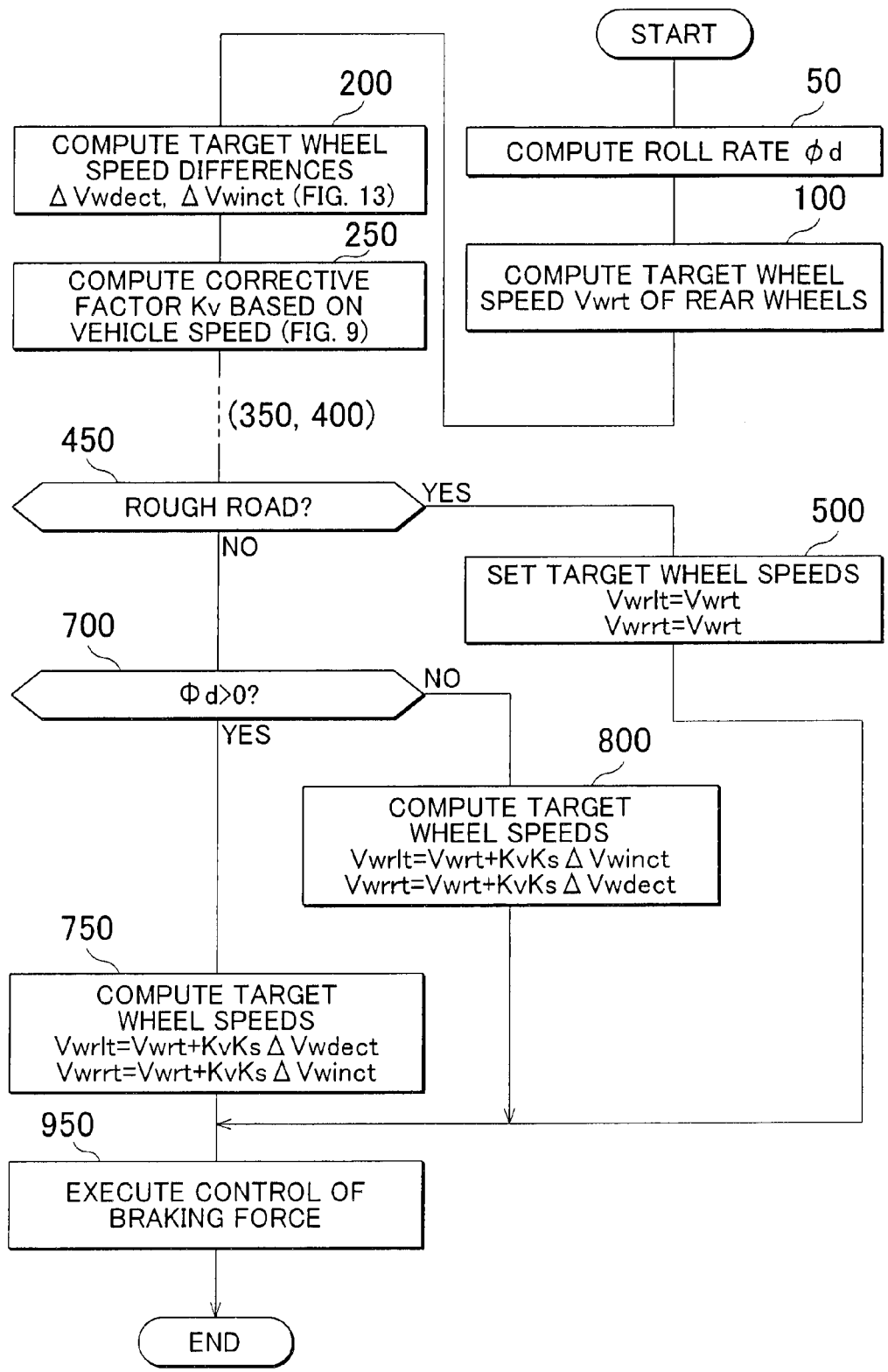
FIG. 7 is a flowchart showing a routine of the front-rear braking force distribution control in a sixth embodiment of the vehicle braking force control apparatus of the invention which is constructed as a modification of the third embodiment.

FIG. 7 is a flowchart showing a routine of the front-rear braking force distribution control in the sixth embodiment of the vehicle braking force control apparatus of the invention which is constructed as a modification of the third embodiment.

In the sixth embodiment, prior to step 100, step 50 is executed as in the fifth embodiment. Besides, the other steps in the sixth embodiment are executed in substantially the same manner as in the foregoing third embodiment.

Therefore, according to the sixth embodiment, there is no need for a sensor that detects the roll rate φd of the vehicle or a sensor that detects the yaw rate γ of the vehicle. Therefore, substantially the same function and effect as in the third embodiment can be attained, and the cost of the braking force control apparatus can be reduced in comparison with the third embodiment.

As can be understood from the foregoing description, according to the above-described embodiments, the front-rear braking force distribution control can be performed so that the braking force is suitably distributed to the rear wheels with respect to the braking forces applied to the front wheels, and the wobble of the vehicle when the front-rear braking force distribution control is performed can be effectively reduced.

According to the above-described embodiments, if it is determined that the traveling road is a rough road in step 450, the target wheel speeds Vwrlt and Vwrrt of the left and right rear wheels are set at the pre-correction target wheel speed Vwrt of the rear wheels in step 500. Therefore, in a situation where the vehicle tends to wobble because the traveling road is a rough road, the target wheel speeds of the left and right rear wheels can be restrained from being unnecessarily corrected.

Besides, according to the embodiments, the change rate Pmd of the master cylinder pressure Pm is computed in steps 350 and 400 as a value that indicates the deceleration gradient of the vehicle when the front-rear braking force distribution control. Then, the corrective factor Ks based on the deceleration gradient is computed so as to be larger as the change rate Pmd of the master cylinder pressure is larger, and, by using the corrective factor Ks, the target wheel speeds Vwrlt and Vwrrt of the left and right rear wheels are computed.

In general, the wobble of the vehicle during the front-rear braking force distribution control is more conspicuous as the deceleration gradient of the vehicle when the front-rear braking force distribution control is started is greater. According to the embodiments, the target wheel speeds of the left and right rear wheels are optimally corrected according to the deceleration gradient of the vehicle. Therefore, the target wheel speeds of the left and right rear wheels when the deceleration gradient is small can be restrained from being excessively corrected, and the wobble of the vehicle when the deceleration gradient is great can be effectively reduced.

In particular, according to the first, third and fifth embodiments, the corrective factor Kv based on the vehicle speed is computed as 0 when the vehicle speed V is less than the first reference value V1. Therefore, it is possible to restrain useless correction of the target wheel speeds of the left and right rear wheels in a low-vehicle speed region in which the wobble of the vehicle is unlikely to occur and the effect of restraining the wobble of the vehicle which is achieved by correction of the target wheel speeds of the left and right rear wheels is small.

Besides, the corrective factor Kv based on the vehicle speed is computed as 1 when the vehicle speed V is greater than or equal to the second reference value V2 and is less than or equal to the third reference value V3. When the vehicle speed V is greater than or equal to first reference value V1 and is less than the second reference value V2, the corrective factor Kv is computed so as to be smaller as the vehicle speed V is lower. Therefore, it is possible to restrain the corrective factor Kv from sharply changing from 1 to 0, as in the case where the corrective factor Kv is computed as 0 when the vehicle speed V is less than the second reference value V2, when the vehicle speed V declines from a value that is larger than the second reference value V2 to a value that is smaller than the second reference value V2.

According to the above-described embodiments, the front-rear braking force distribution control is performed on the basis of the wheel speed difference between the front wheels and the rear wheels, and the control of braking force for reducing the wobble of the vehicle is performed on the basis of the wheel speed difference between the left and right rear wheels. In the case where the foregoing controls are performed on the basis of the degrees of slip of the wheels which are determined through the use of the speed of the vehicle as a reference speed, it is necessary to estimate the speed of the vehicle. The degrees of slip of the wheels mean the slip amounts that are differences between the wheel speeds of the wheels and the speed of the vehicle or the slip rates obtained by dividing the slip amounts by the vehicle speed. On the other hand, according to the above-described embodiments, the front-rear braking force distribution control and the control of braking force for reducing the wobble of the vehicle can easily be performed without a need to estimate the speed of the vehicle.

While specific embodiments of the invention have been described above, it should be apparent to those having ordinary skill in the art that the invention is not limited to the above-described embodiments and that various other embodiments are also possible within the scope of the invention.

In the above-described embodiments, the target wheel speed difference of the rear wheels relative to the front wheels is computed first, and then the sum of the greater one of the wheel speeds of the left and right front wheels and the target wheel speed difference is computed as a target wheel speed of the rear wheel. However, the target wheel speed of the rear wheel may be set based on the other predetermined relationship between the wheel speed of the front wheel and the target wheel speed of the rear wheel, by using a map for example.

Further, in the above-described embodiments, the front-rear braking force distribution control is performed on the basis of the wheel speed difference between the front wheels and the rear wheels, and the control of braking force for reducing the wobble of the vehicle is performed on the basis of the wheel speed difference between the left and right rear wheels. However, these control may also be changed so as to be performed on the basis of the degrees of slip of the wheels determined through the use of the speed of the vehicle as a reference speed, that is, on the basis of the slip amounts of the wheels or the slip rates thereof.

In that case, in the front-rear braking force distribution control, the braking forces applied to the left and right rear wheels are controlled individually so that the degree of slip of each rear wheel is equal to a target degree of slip of the corresponding one of rear wheels, and thereby the braking forces applied to the left and right rear wheels are controlled individually so that the wheel speed of each rear wheel becomes equal to the target wheel speed of a corresponding one of the rear wheels. The target degree of slip of the rear wheel may be set to a degree which is lower than the degree of slip of the front wheels by a slip degree target difference, for example. Besides, as for the control of braking force for reducing the wobble of the vehicle, the target degree of slip of at least one of the left and right rear wheels is corrected so that the target degree of slip of the rear wheel on a ground contact load increase side becomes higher than the target degree of slip of the rear wheel on the ground contact load decrease side. Then, the correction amount is computed on the basis of a parameter that is related to the change rate of the amount of load shift in the vehicle transverse direction.

Besides, the degrees of slip of the left and right rear wheels relative to the degree of the slip of front wheels may be the degrees of slip of the left and right rear wheels relative to the degree of the slip of the front wheel whose wheel speed is the higher. The degree of the slip may be the slip amount or the slip rate thereof.

Besides, although in the above-described embodiments, the parameter related to the change rate of the amount of load shift in the vehicle transverse direction is the roll rate $\phi$d of the vehicle, the parameter may also be set as any one of the yaw acceleration of the vehicle, the lateral jerk (jerk in the lateral direction) of the vehicle, and the change rate of difference in the ground contact loads between the left and right wheels. Besides, the any one of the yaw acceleration of the vehicle, the lateral acceleration of the vehicle and the change rate of the difference in the ground contact loads between the left and right wheels may be computed on the basis of the wheel speeds of the wheels.

Besides, the correction amount for correcting the target wheel speed of at least one of the left and right rear wheels may be computed on the basis of the aforementioned parameter, and, by using the correction amount, the target wheel speed of the at least one of the left and right rear wheels may be corrected.

In that case, the correction amounts for correcting the target wheel speeds of the left and right rear wheels may be computed on the basis of the parameter, and, by using the correction amounts, the target wheel speeds of the left and right rear wheels may be corrected.

Besides, although in the above-described embodiments, the magnitude of the increasing correction amount (positive correction amount) that increases the target wheel speed of one of the left and right rear wheels is basically equal to the magnitude of the decreasing correction amount (negative correction amount) that decreases the target wheel speed of the other of the left and right rear wheels, the increasing correction amount and the decreasing correction amount may instead be set at values whose magnitudes are different from each other.

In the first to fourth embodiments and the sixth embodiment, the increasing correction amount and the decreasing correction amount are different in magnitude from each other in a region in which the magnitude of the yaw rate γ is larger, than the reference value γc. However, these embodiments may be changed so that the increasing correction amount and the decreasing correction amount are always equal in magnitude to each other, irrespective of the magnitude of the yaw rate γ.

Besides, in the above-described embodiments, the braking pressures for the left and right rear wheels are controlled so that the wheel speeds of the left and right rear wheels each become equal to a value within a predetermined range that contains a corresponding one of the target wheel speeds Vwrlt and Vwrrt. However, these embodiments may be changed so that an upper limit value and a lower limit value for each of the target wheel speeds Vwrlt and Vwrrt may be computed, and then the braking pressures for the left and right rear wheels may be controlled so that each of the wheel speeds of the left and right rear wheels becomes equal to a value between the corresponding upper limit value and the corresponding lower limit value.

Besides, in the above-described embodiments, the change rate Pmd of the master cylinder pressure Pm is computed as a value that shows the deceleration gradient of the vehicle occurring when the front-rear braking force distribution control is started. However, the value that shows the deceleration gradient may also be, for example, a derivative value of the deceleration Vd of the vehicle.

Besides, in the second and fourth embodiments, the elapsed time T is an elapsed time following the time point at which the front-rear braking force distribution control is started. However, as long as the elapsed time T is a value that shows the duration of braking of the vehicle, the elapsed time T may also be set as the elapsed time following the time point at which the correction of the target degree of slip is started or the elapsed time following the time point at which a driver's braking operation is started.

Besides, although the fifth and sixth embodiments are constructed as modifications of the first and third embodiments, the second and fourth embodiments may also be modified in substantially the same manner as in the fifth and sixth embodiments.

In the above-described embodiments, the determination of the rear wheel on the ground contact load increase side and the rear wheel on the ground contact load decrease side may be performed on the basis of the direction in which the load shift in the left-right direction (the vehicle transverse direction).

In that case, the direction in which the load shift in the left-right direction changes may be determined on the basis of any one of the yaw acceleration of the vehicle, the roll rate of the vehicle, the lateral acceleration of the vehicle, the change rate of difference in the ground contact loads between the left and right wheels.

The invention claimed is:

1. A vehicle braking force control apparatus comprising a controller
    that performs a front-rear braking force distribution control that distributes a braking force to front wheels and rear wheels, wherein in the front-rear braking force distribution control, the braking forces applied to the left and right rear wheels are controlled individually so that a wheel speed of each of the rear wheels is equal to a target wheel speed of the rear wheel, which is set based on a predetermined relationship between the wheel speed of the front wheel and the target wheel speed of the rear wheel, and
    that corrects the target wheel speed of each of the left and right rear wheels, based on a parameter that is related to a change rate of amount of load shift in a vehicle transverse direction, such that the target wheel speed of the rear wheel on a ground contact load increase side is less than the target wheel speed of the rear wheel on a ground contact load decrease side, wherein
    the controller corrects the target wheel speed of each of the left and right rear wheels so that a magnitude of a correction amount for correcting the target wheel speed of the left rear wheel and the magnitude of a correction amount for correcting the target wheel speed of the right rear wheel are equal to each other.

2. The vehicle braking force control apparatus according to claim 1, wherein
    the controller corrects the target wheel speed of each of the left and right rear wheels so that a difference in the target wheel speed between the left and right rear wheels after the target wheel speed of each of the left and right rear wheels is corrected corresponds to the parameter.

3. The vehicle braking force control apparatus according to claim 1, wherein
    the parameter includes one of a yaw acceleration of the vehicle, a roll rate of the vehicle, a lateral jerk of the vehicle, a change rate of a difference in ground contact loads between left and right wheels.

4. The vehicle braking force control apparatus according to claim 1, wherein
    the controller changes a correction amount for correcting the target wheel speed of each of the left and right rear wheels, based on a vehicle speed, so that the correction amount is greater in magnitude when the vehicle speed is relatively high than when the vehicle speed is relatively low.

5. The vehicle braking force control apparatus according to claim 1, wherein
    the controller changes a correction amount for correcting the target wheel speed of each of the left and right rear wheels, based on an elapsed time following a time point at which the target wheel speed of each of the left and right rear wheels starts to be corrected, so that the correction amount is smaller in magnitude when the elapsed time is relatively long than when the elapsed time is relatively short.

6. The vehicle braking force control apparatus according to claim 1, wherein
    the controller changes a correction amount for correcting the target wheel speed of each of the left and right rear wheels, based on an index value of a change rate of deceleration of the vehicle when the target wheel speed of the each of the left and right rear wheels starts to be corrected, so that the correction amount is larger in magnitude when the index value is relatively great than when the index value is relatively small.

7. The vehicle braking force control apparatus according to claim 1, wherein
the controller estimates the parameter based on at least the wheel speeds of a pair of left and right wheels.

8. The vehicle braking force control apparatus according to claim 1, wherein
the predetermined relationship is a relationship in which the target wheel speed of the rear wheel is greater than the wheel speed of the front wheel by a wheel speed target difference.

9. The vehicle braking force control apparatus according to claim 1, wherein
the controller controls the braking forces applied to the left and right rear wheels individually so that a degree of slip of each of the rear wheels is equal to a target degree of slip of the rear wheel, which is set based on the predetermined relationship, to control the braking forces applied to the left and right rear wheels individually so that the wheel speed of each of the rear wheels is equal to the target wheel speed of the rear wheel, and
corrects the target degree of slip of each of the left and right rear wheels based on the parameter so that the target degree of slip of the rear wheel on a ground contact load increase side is greater than the target degree of slip of the rear wheel on a ground contact load decrease side to correct the target wheel speed of each of the left and right rear wheels.

10. The vehicle braking force control apparatus according to claim 9, wherein
the predetermined relationship is a relationship in which the target degree of slip of the rear wheel is less than the degree of slip of the front wheel by a slip degree target difference.

11. A vehicle braking force control method comprising:
performing a front-rear braking force distribution control that distributes a braking force to front wheels and rear wheels, wherein in the front-rear braking force distribution control, the braking forces applied to the left and right rear wheels are controlled individually so that a wheel speed of each of the rear wheels is equal to a target wheel speed of the rear wheel, which is set based on a predetermined relationship between the wheel speed of the front wheel and the target rear wheel speed of the rear wheel, and
correcting the target wheel speed of each of the left and right rear wheels, based on a parameter that is related to a change rate of amount of load shift in a vehicle transverse direction, so that the target wheel speed of the rear wheel on a ground contact load increase side is less than the target wheel speed of the rear wheel on a ground contact load decrease side, wherein
the target wheel speed of each of the left and right rear wheels is corrected so that a magnitude of a correction amount for correcting the target wheel speed of the left rear wheel and the magnitude of a correction amount for correcting the target wheel speed of the right rear wheel are equal to each other.

* * * * *